(12) United States Patent
Nakaya

(10) Patent No.: US 6,701,103 B2
(45) Date of Patent: Mar. 2, 2004

(54) POWER SUPPLY CONTROL APPARATUS AND IMAGE FORMATION APPARATUS

(75) Inventor: Masahide Nakaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 6 days.

(21) Appl. No.: 10/096,282

(22) Filed: Mar. 13, 2002

(65) Prior Publication Data

US 2002/0131788 A1 Sep. 19, 2002

(30) Foreign Application Priority Data

Mar. 14, 2001 (JP) ........................................ 2001-071943
Feb. 28, 2002 (JP) ........................................ 2002-055055

(51) Int. Cl.[7] .............................................. G03G 21/00
(52) U.S. Cl. ........................................... 399/88; 307/66
(58) Field of Search ..................... 399/88, 37; 307/64, 307/66, 85; 713/300, 340; 714/24

(56) References Cited

U.S. PATENT DOCUMENTS 5,668,464 A * 9/1997 Krein et al. ................. 323/259
5,884,122 A * 3/1999 Kawabuchi et al. .......... 399/88
6,255,744 B1 * 7/2001 Shih et al. ..................... 307/66

FOREIGN PATENT DOCUMENTS

JP          7-298491 A  * 11/1996
JP         11-178209 A  *  7/1999

* cited by examiner

*Primary Examiner*—Joan Pendegrass
(74) *Attorney, Agent, or Firm*—Oblon, Spivak, McClelland, Maier & Neustadt, P.C.

(57) ABSTRACT

In the image formation apparatus, an active filter converts an AC power supply supplied from an AC power supply to a DC voltage, and first and second DC—DC converters convert the DC voltage converted by the active filter to voltages at predetermined levels and respectively supplies the voltages to an image forming engine and an engine control unit. A power supply control unit stops the operation of the first DC—DC converter in order to allow the second DC—DC converter to continue supply of the voltage to the engine control unit when disconnection of the AC power supply is detected.

20 Claims, 12 Drawing Sheets

POWER SUPPLY CONTROL APPARATUS AND IMAGE FORMATION APPARATUS

FIELD OF THE INVENTION

The present invention relates to a power supply control apparatus and an image formation apparatus capable of protecting information in processing even if power fails or an AC power supply is erroneously turned off.

BACKGROUND OF THE INVENTION

Conventionally, various methods have been used for data backup of image forming devices or the like at a time of power failure. A first method is provided to back up data at the time of power failure by simultaneously using an uninterruptible power supply (UPS) and a commercial power supply. A second method is provided to perform processing for recovery by switching an AC power supply on and off by a relay based on an on/off signal of a power switch without turning off the AC power supply by the power switch, and providing a time difference between an operation of the power switch and an operating timing of the relay.

The first method (the case of using the UPS), however, cannot cope with a case where the power switch is turned off during the operation. The second method (the case where a time difference is provided between the operation of the power switch and the operating timing of the relay) cannot also cope with a case where the AC power supply itself goes off due to power failure or the like. Further, factors in that the AC power supply goes off include cases where instantaneous power failure of the commercial power supply occurs, a power cord is erroneously disconnected, or an operator erroneously turns off the power switch during operation. For example, when the AC power supply is off while data is being written in a hard disk, the data may be corrupted.

SUMMARY OF THE INVENTION

It is an object of this invention to provide a power supply control apparatus and an image formation apparatus capable of protecting data in processing with a simple and low-cost configuration when the AC power supply is erroneously turned off or power failure occurs.

The power supply control apparatus according to one aspect of this invention comprises an active filter which converts an AC voltage supplied from an AC power supply to a DC voltage, and a DC—DC converter which converts the DC voltage converted by the active filter to voltages at predetermined levels, and respectively supplies the voltages to a load and a load control unit that controls the load. The power supply control apparatus also comprises a power supply control unit which controls operation of the DC—DC converter, and a detection unit which detects disconnection of the AC power supply. The power supply control unit controls the DC—DC converter in order to allow the DC—DC converter to continue supply of the voltage to the load control unit for a predetermined time when the detection unit detects disconnection of the AC power supply.

The image formation apparatus according to another aspect of this invention comprises an image forming engine which emits laser beams corresponding to image information onto a photoreceptor to form an electrostatic latent image on the photoreceptor, forms a toner image on the electrostatic latent image, and transfers a formed toner image to a transfer sheet. The image formation apparatus also comprises an image forming engine control unit which controls the image forming engine, and an active filter which converts an AC voltage supplied from an AC power supply to a DC voltage. The image formation apparatus further comprises a DC—DC converter which converts the DC voltage converted by the active filter to voltages at predetermined levels and respectively supplies the voltages to the image forming engine and the image forming engine control unit, a power supply control unit which controls operation of the DC—DC converter, and a detection unit which detects disconnection of the AC power supply. The power supply control unit controls the DC—DC converter in order to allow the DC—DC converter to continue the supply of the voltage to the image forming engine control unit for a predetermined time when the detection unit detects disconnection of the AC power supply.

Other objects and features of this invention will become apparent from the following description with reference to the accompanying drawings.

DETAILED DESCRIPTIONS

Embodiments of the power supply control apparatus of this invention and the image formation apparatus to which this power supply control apparatus is applied will be explained in detail below in order of a first embodiment and a second embodiment with reference to the accompanying drawings.

Figure 1:
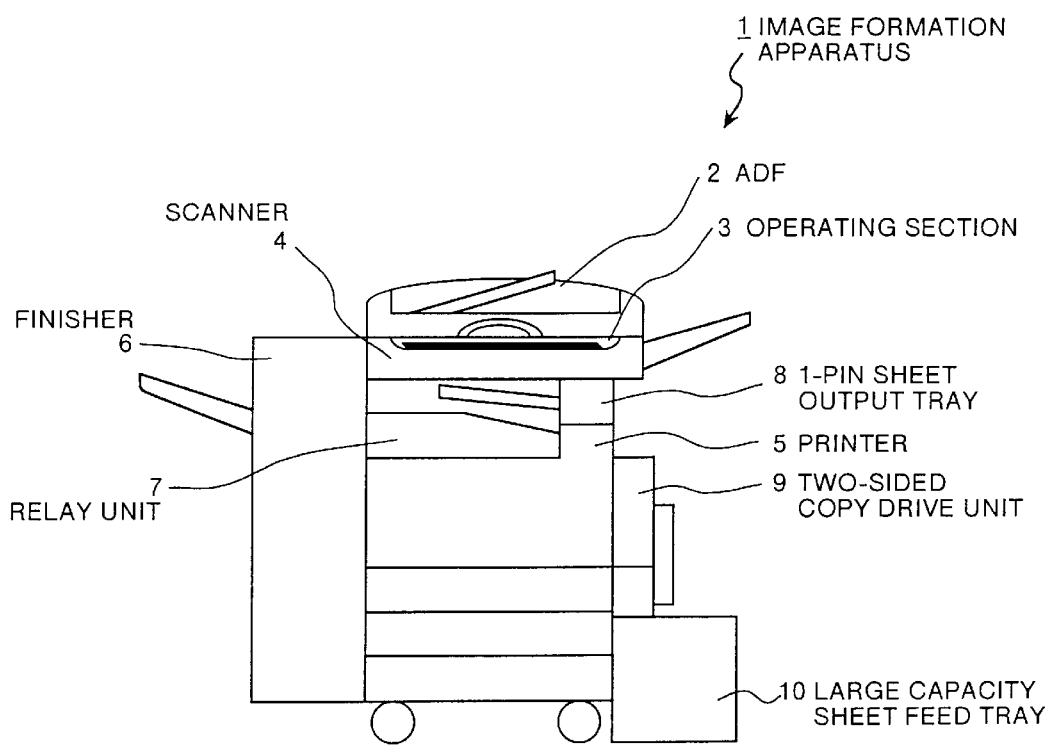
FIG. 1 is a diagram showing an external configuration of an image formation apparatus according to a first embodiment.

FIG. 1 is a diagram showing an external configuration of an image formation apparatus according to a first embodiment of this invention. In this figure, legend 1 represents an image formation apparatus. The image formation apparatus 1 comprises an automatic document feeder ADF 2, an operating section 3 through which job information such as a number of sheets to be printed is entered, and a scanner 4 that scans a document, converts the scanned document to image information, and outputs the image formation to a printer 5. This image formation apparatus also comprises the printer 5 that is an image forming engine section for forming an image based on the image information of the document input from the scanner 4 to print the image to a sheet, a finisher 6 that staples printed sheets, a relay unit 7 that conveys the sheets from the printer 5 to the finisher 6, a 1-pin sheet output tray 8, a two-sided copy drive unit 9, and a large-capacity sheet feed tray 10.

Figure 2:
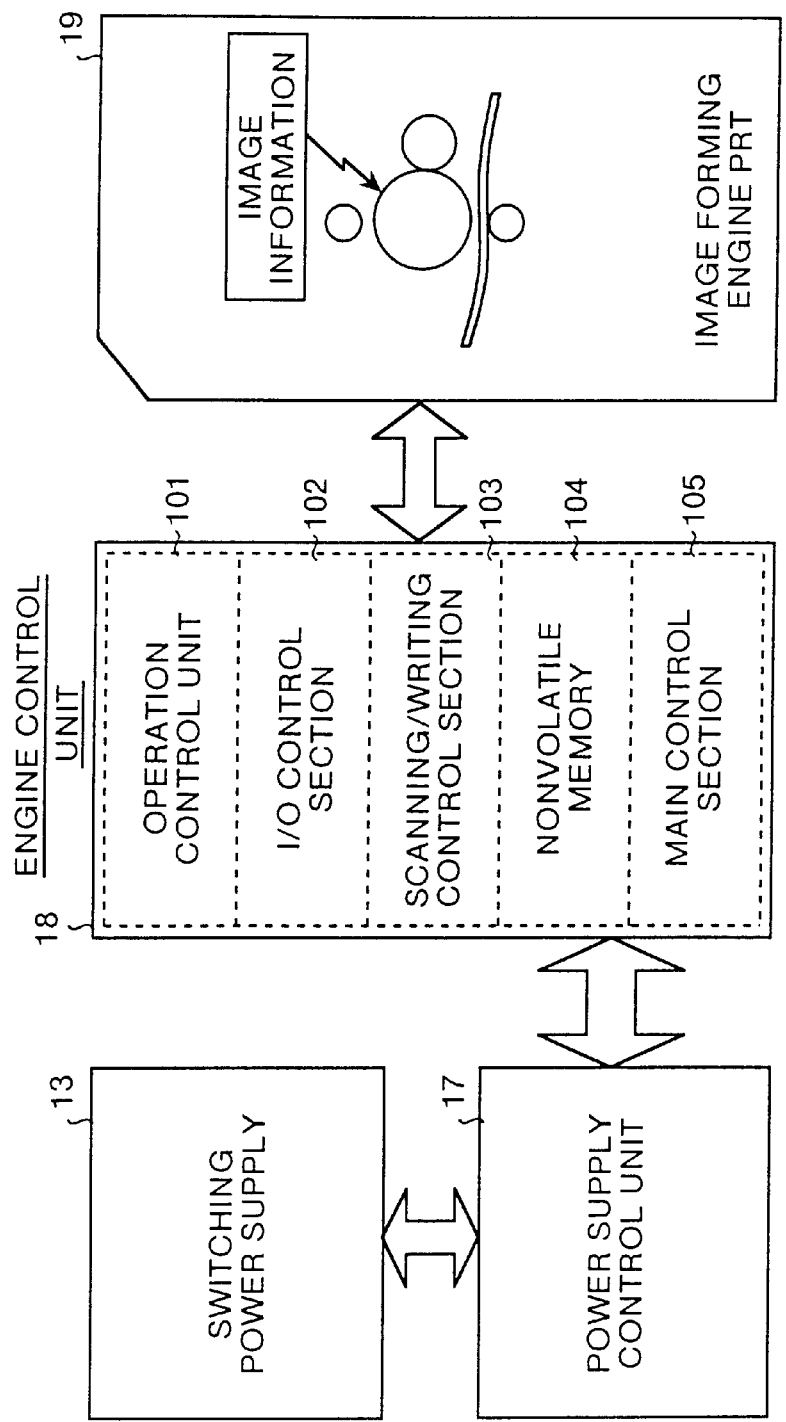
FIG. 2 is a diagram showing a configuration of a control system in the image formation apparatus of FIG. 1.

FIG. 2 is a diagram showing the configuration of the control system in the image formation apparatus 1 of FIG. 1. In this figure, legend 13 represents a switching power supply that supplies power to the respective sections of the image formation apparatus 1, 17 represents a power supply control unit that controls the switching power supply 13, 18 represents an engine control unit that controls the overall image formation apparatus, and 19 represents an image forming engine that performs printing to a sheet. The power supply control unit 17 comprises a microprocessor that executes a program stored in ROM, the ROM where the program to allow the microprocessor to operate is stored, RAM used as a work area of the microprocessor, an A-D converter, and a D-A converter.

The engine control unit 18 comprises an operation control section 101 that performs processing of job information such as the number of sheets to be printed entered through the operating section 3, an I/O control section 102, and a scanning-writing control section 103 that scans a sheet document to obtain image formation, performs processing on the image information, and writes the image information in the image forming engine 19. The engine control unit 18 also comprises a nonvolatile memory 104, provided with a device such as a nonvolatile RAM or a hard disk, that holds data even when a power supply is disconnected, and a main control section 105 that controls the respective control sections of the image formation apparatus as a whole system.

When it is detected that a supply of the AC power supply to the switching power supply 13 is stopped, the main control section 105 of the engine control unit 18 issues an instruction (an AC power supply OFF signal) to turn off the first DC—DC converter (power supply system) 15, that mainly drives a mechanical system of the image forming engine 19, to the power supply control unit 17, and saves job information and image information in processing on the nonvolatile memory 104.

Figure 3:
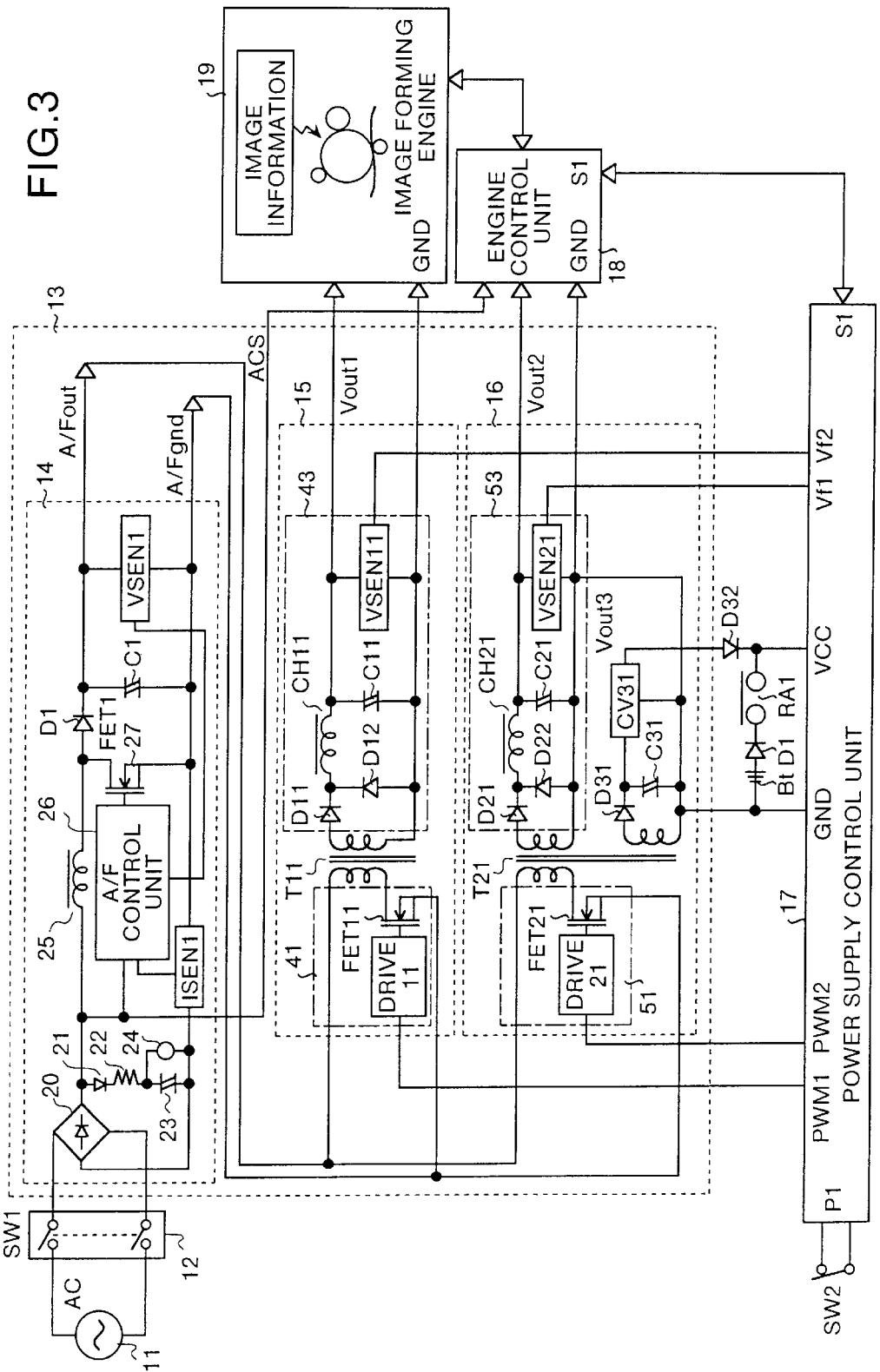
FIG. 3 is a diagram showing a configuration of a power supply control system in the image formation apparatus of FIG. 1.

FIG. 3 is a diagram showing the configuration of the power supply control system in the image formation apparatus 1 of FIG. 1. In FIG. 3, the same legends are assigned to those corresponding to the sections having the same functions in FIG. 1. In this figure, the legend 11 represents an AC power supply (commercial power supply) that supplies an AC voltage to the switching power supply 13, 12 represents a main power switch that switches on and off the AC voltage supplied from the AC power supply 11 to the switching power supply 13.

The switching power supply 13 converts the AC voltage supplied from the AC power supply 11 to DC voltages at predetermined levels and outputs the DC voltages to the image forming engine 19 and the engine control unit 18, respectively. The power supply control unit 17 controls the switching power supply 13. The engine control unit 18 supplies a driving voltage to the image forming engine 19 for controlling.

The switching power supply 13 comprises an active filter 14 that converts the AC voltage supplied from the AC power supply 11 to a DC voltage, and outputs (indicated by A/F out in the figure) the DC voltage to the first DC—DC converter (power supply system) 15 and the second DC—DC converter (soft power supply system) 16, respectively. The switching power supply 13 also comprises the first DC—DC converter (power supply system) 15 that subjects the DC voltage input from the active filter 14 to DC—DC conversion based on the control signal input from the power supply control unit 17 to obtain a converted DC voltage, and outputs (indicated by Vout1 in the figure) the converted DC voltage to the image forming engine 19 of the image formation apparatus 1. The switching power supply 13 further comprises the second (soft power supply system) DC—DC converter 16 that subjects the DC voltage input from the active filter 14 to DC—DC conversion based on the control signal input from the power supply control unit 17 to obtain a converted DC voltage, and outputs (indicated by Vout2 in the figure) the converted DC voltage to the engine control unit 18.

The first DC—DC converter (power supply system) 15 is composed of a switching circuit 41 provided with a drive circuit (DRIVE 11) and a FET 11, a transformer T11, a rectifying-smoothing circuit 43 formed of a diode D11, a transistor C11, and a coil CH 11, and a voltage detection unit (VSEN 11).

The second DC—DC converter (soft power supply system) 16 is composed of a switching circuit 51 provided with a drive circuit (DRIVE 21) and a FET 21, a transformer T21, a rectifying-smoothing circuit 53 formed of a diode D21, a transistor C21, and a coil CH21, and a voltage detection unit (VSEN 21).

The operation of the switching power supply 13 will be explained below. When the main power switch 12 is turned on, the AC voltage is supplied from the AC power supply 11 to the active filter 14 of the switching power supply 13. In the active filter 14, the AC voltage input from the AC power supply 11 is rectified by a diode bridge 20, and a voltage having a full-wave rectified waveform is generated. The voltage (ACS) having the full-wave rectified waveform is input to a starting circuit composed of a diode 21, a resistor 22, a capacitor 23, and a coil of a relay 24, and is also input to an inductance 25, an A/F control unit 26, and an AC voltage detection terminal of the engine control unit 18. Accordingly, the power supply control unit 17, the first and second DC—DC converters 15, 16, and the active filter 14 are activated. The active filter 14 is controlled so that the input current flowing through the inductance has a sinusoidal wave similar to the full-wave rectified waveform of the AC power supply 11.

Figure 4:
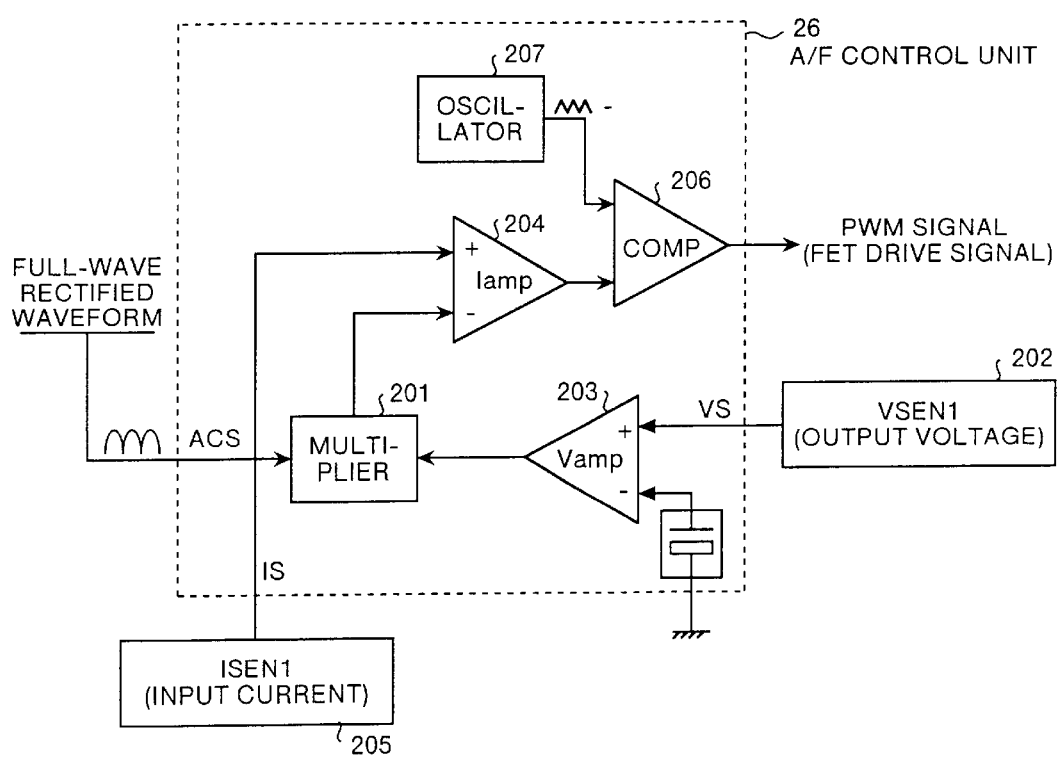
FIG. 4 is a diagram showing a configuration of the active filter (A/F) control unit of FIG. 3.

The operation of the active filter 14 will be explained below with reference to FIG. 3 and FIG. 4. FIG. 4 is a diagram showing the configuration of the A/F control unit 26 of FIG. 3. The A/F control unit 26 is provided with a multiplier 201, a voltage error amplifier (Vamp) 203, a current error amplifier (Iamp) 204, a PWM comparator (COMP) 206, and an oscillator 207.

As shown in FIG. 4, the voltage (ACS) having a full-wave rectified waveform of the AC power supply 11 is input to one of input terminals of the multiplier 201, and an output voltage (Vs) detected in a voltage detection unit (VSEN1) 202 is input to the other input terminal through the voltage error amplifier (Vamp) 203. The multiplier 201 outputs a voltage (this voltage becomes a full-wave rectified waveform) proportional to a product obtained by multiplying these two voltages by each other, to one of input terminals of the current error amplifier (Iamp) 204. An input current (Is) of the active filter 14 detected by the current detection unit (ISEN1) 205 is input to the other input terminal of the current error amplifier (Iamp) 204.

The current error amplifier (Iamp) 204 outputs a difference signal between an output (voltage having a full-wave rectified waveform) of the multiplier and an input current, to one of input terminals of the PWM comparator (COMP) 206. A triangular wave is input from the oscillator 207 to the other input terminal of the PWM comparator (COMP) 206. The PWM comparator (COMP) 206 compares the difference signal input from the current error amplifier (Iamp) 204 with the triangular wave input from the oscillator 207 to obtain a comparing signal, and outputs the comparing signal to a switching element 27 as a PWM signal (FET driving signal) The PWM signal is controlled so that its pulse width increases when the output of the current error amplifier (Iamp) 204 is higher, that is, when the input current is lower than the full-wave rectified waveform.

Figure 5:
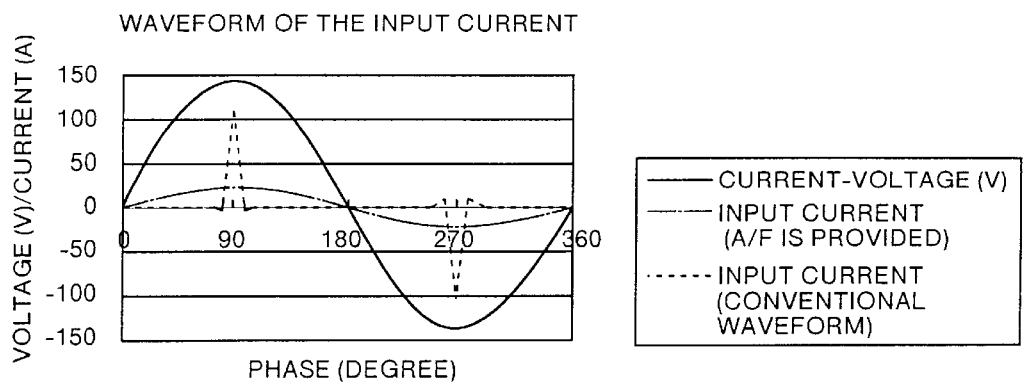
FIG. 5 is a diagram showing waveforms of an input current/input voltage input to the active filter.
Figure 6:
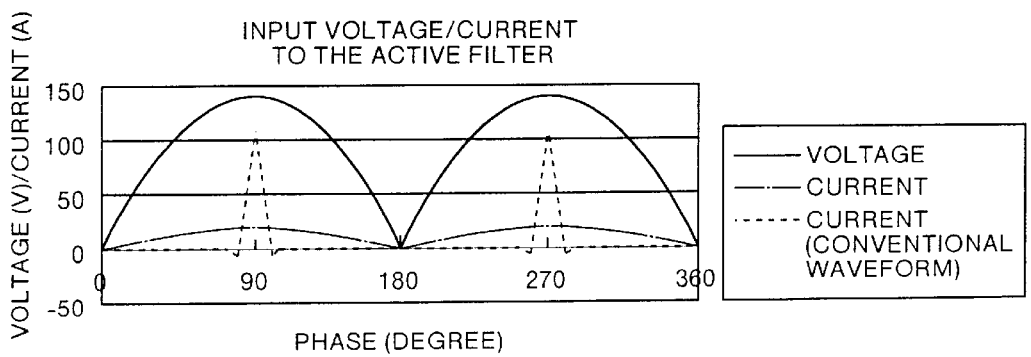
FIG. 6 is a diagram showing rectified waveforms of an input current/input voltage in the active filter.

Accordingly, the input current flowing through the inductance of the active filter 14 is controlled so that the input current has a waveform similar to the full-wave rectified waveform of the AC power supply. FIG. 5 is a diagram showing the waveforms of an input current/input voltage input to the active filter 14. FIG. 6 is a diagram showing the rectified waveforms of an input current/input voltage in the active filter 14.

As shown in FIG. 5 and FIG. 6, the solid lines indicate the waveform of the voltage, the chain lines indicates the waveform of the input current in this invention (when the active filter is provided), and the dotted lines indicate the conventional waveform of the input current. The conventional waveform of the input current (without the active filter) is a peak rectified waveform in which an input current is flown to the converter only in a period when the power supply voltage is high as shown in FIG. 5 and FIG. 6. In this invention, however, it is possible to form the waveform of the input current to a waveform similar to the waveform of the input voltage.

The output voltage (A/Fout) of the active filter 14 is controlled to be a constant voltage. The voltage (ACS) having a full-wave rectified waveform detected in the active filter 14 is input also to the engine control unit 18. The engine control unit 18 controls the system according to whether the power is supplied from the AC power supply. In order to cope with the case where the main power switch 12 is erroneously tuned off or power failure occurs during operation of the image forming engine 19, the engine control unit 18 stores data in processing or the like if it is detected that the AC power supply 11 is disconnected.

The respective operations of the power supply control unit 17 and the first and second DC—DC converters 15, 16 will be explained below. The first and second DC—DC converters 15 and 16 are supplied with an output (A/Fout) of the active filter 14.

The first DC—DC converter 15 generates DC power for the power system, that is, a 24-volt DC voltage (Vout1) and supplies the DC voltage to the image forming engine 19. The second DC—DC converter 16 generates DC power for the control system, that is, a 5-volt DC voltage (Vout2) and supplies the DC voltage to the engine control unit 18.

When the main power switch 12 is turned on, a current flows from the diode bridge 20 to the coil of the relay 24 through the diode 21 and the resistor 22 of the starting circuit to turn on a contact of the relay (RA1) connected to the power supply control unit 17. Accordingly, a voltage is supplied from a buttery (B1) to a power supply terminal (VCC) of the power supply control unit 17 through a diode (D1) to activate the power supply control unit 17.

The power supply control unit 17, which has been activated, then starts controlling so as to activate the DC—DC converter 16. When the DC—DC converter 16 is activated, DC power is supplies from its output terminal (Vout2) to the engine control unit 18 to activate the engine control unit 18. The power supply control unit 17 activates the DC—DC converter 15 that generates DC power for the power system.

Figure 7:
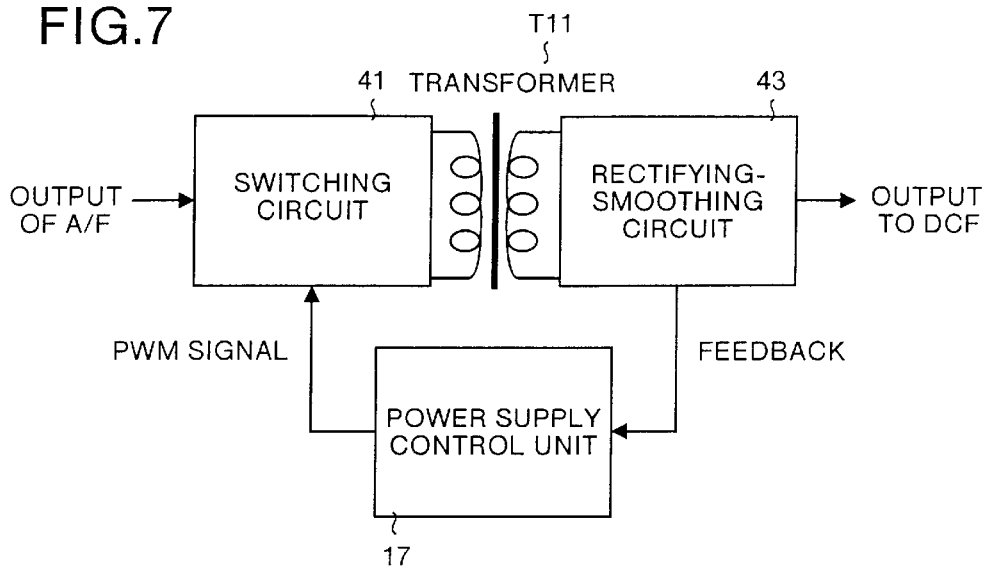
FIG. 7 is a diagram showing a power supply control unit and a control loop of a first DC—DC converter.
Figure 8:
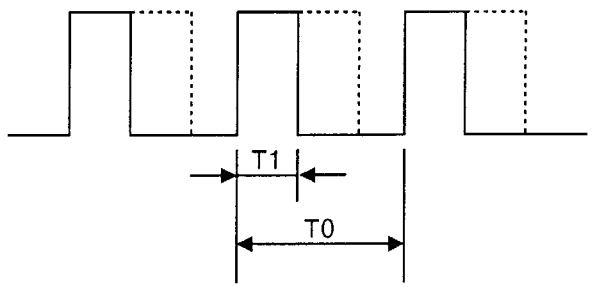
FIG. 8 is a diagram showing a waveform of a pulse-width modulation (PWM) signal.
Figure 9:
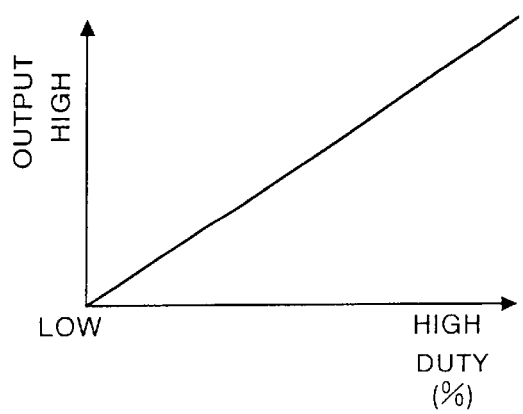
FIG. 9 is a characteristic diagram showing characteristics of the PWM signal.
Figure 10:
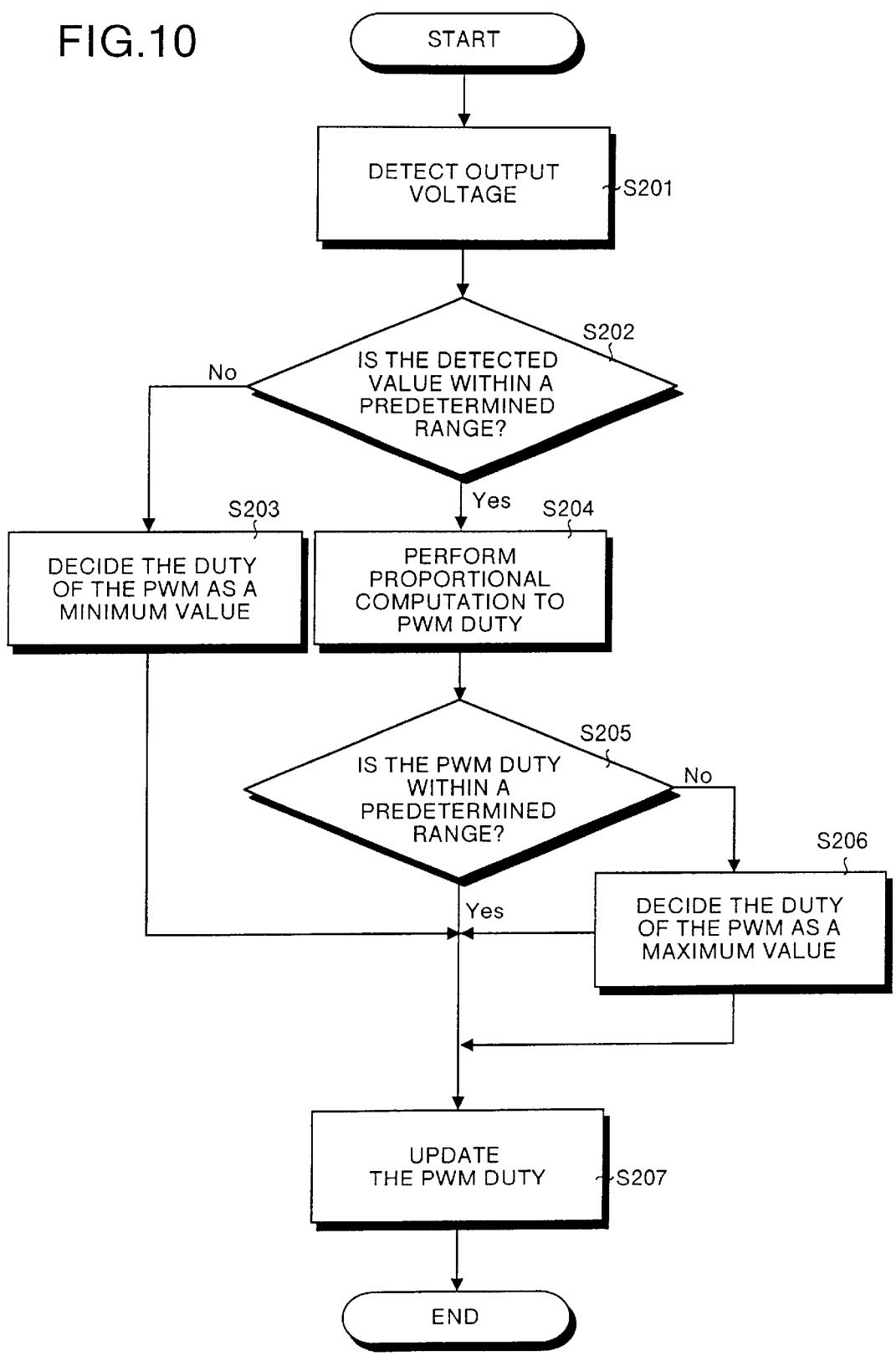
FIG. 10 is a flowchart for explaining operation of constant voltage controlling of a voltage control unit.

How the power supply control unit 17 controls the DC—DC converters 15 and 16 will be explained below with reference to FIG. 7 to FIG. 10. FIG. 7 is a diagram showing the power supply control unit 17 and the control loop of the first DC—DC converter 15. FIG. 8 is a diagram showing the waveform of the PWM signal. FIG. 9 is a characteristic diagram showing characteristics of the PWM signal. FIG. 10 is a flowchart for explaining the operation of constant voltage controlling by the voltage control unit 17. The power supply control unit 17 provides controls to the first and second DC—DC converters 15 and 16 in the same manner as each other except for the case where respective target values are different. Therefore, only the processing of controlling the first DC—DC converter 15 will be explained here.

As shown in FIG. 17, the switching circuit 41 switches the output (A/Fout) from the active filter 14 based on the PWM signal (about 100 KHz) input from the power supply control unit 17 to drive the transformer T11. The rectifying-smoothing circuit 43 rectifies and smoothes output of the transformer T11 to obtain DC output (Vout1), and supplies the DC output (Vout1) to the image forming engine 19 (load). Further, the rectifying-smoothing circuit 43 feeds back the voltage detected by the voltage detection unit (VSEN11) to the power supply control unit 17. The power supply control unit 17 performs feedback control by generating a PWM signal so that the detected voltage input from the voltage detection unit (VSEN11) becomes a predetermined value and outputting the PWM signal to the switching circuit 41. Accordingly, the power supply control unit 17 stabilizes (constant voltage controlling) the output of the first DC—DC converter 15.

FIG. 8 is a diagram showing an example of the waveform of the PWM signal output from the power supply control unit 17. The power supply control unit 17 has a fixed cycle T0 of the PWM signal and changes the pulse width T1 according to the detected voltage input from the voltage detection unit (VSEN11). A duty ratio of the pulse width T1 to the cycle T0 is referred to as "duty", and a relationship between the duty of the PWM signal and the output of the first DC—DC converter 15 is referred to as PWM characteristics. FIG. 9 is a characteristic diagram showing the PWM characteristics. In this figure, the lateral axis represents the duty, and the longitudinal axis represents the output of the DC—DC converter. The power supply control unit 17 changes the duty in proportion to the output of the DC—DC converter as shown in FIG. 9.

The constant voltage controlling for the first DC—DC converter 15 by the power supply control unit 17 will be explained below with reference to FIG. 10. FIG. 10 shows the flowchart for explaining the operation of constant voltage controlling for the DC—DC converter by the power supply control unit 17. The power supply control unit 17 performs constant voltage controlling using the software in each predetermined cycle, i.e., for each 1 ms.

As shown in FIG. 7, the power supply control unit 17 subjects the voltage detected by the voltage detection unit (VSEN11) to A-D conversion by the A-D converter provided inside the power supply control unit 17, and loads data for a converted voltage as a digital value (detected value) (step S201). The power supply control unit 17 determines whether the detected value is within a predetermined range (step S202). If it is determined that the detected value is beyond the range (NO at step S202), that is, if the detected value is abnormal, the power supply control unit 17 decides the duty of the PWM signal as a minimum value (step S203), and proceeds to step S207.

On the other hand, if the detected value is within the predetermined range (YES at step S202), that is, if it is normal, the power supply control unit 17 performs proportional computation to decide the duty of the PWM signal (step S204). More specifically, the power supply control unit 17 sets a setting value of the output, i.e., 24 volts as a target value through the proportional computation, and increases or decreases the duty according to the difference between the target value and the current output value. It is noted that the target value of the second DC—DC converter 16 is 5 volts.

The power supply control unit 17 then determines whether the duty decided at step S204 is within a predetermined range (i.e., within 70%) (step S205). If it is determined that the decided duty is within the predetermined range (YES at step S205), the power supply control unit 17 proceeds to step S207. If it is determined that the decided duty is beyond the predetermined range (NO at step S205), the power supply control unit 17 decides the maximum value (i.e., 70%) of the predetermined range as the duty of the PWM signal (step S206), and proceeds to step S207.

At step S207, the power supply control unit 17 generates a PWM signal of the decided duty, and outputs the PWM signal to the switching circuit 41 of the first DC—DC converter 15 (step S207).

Figure 11:
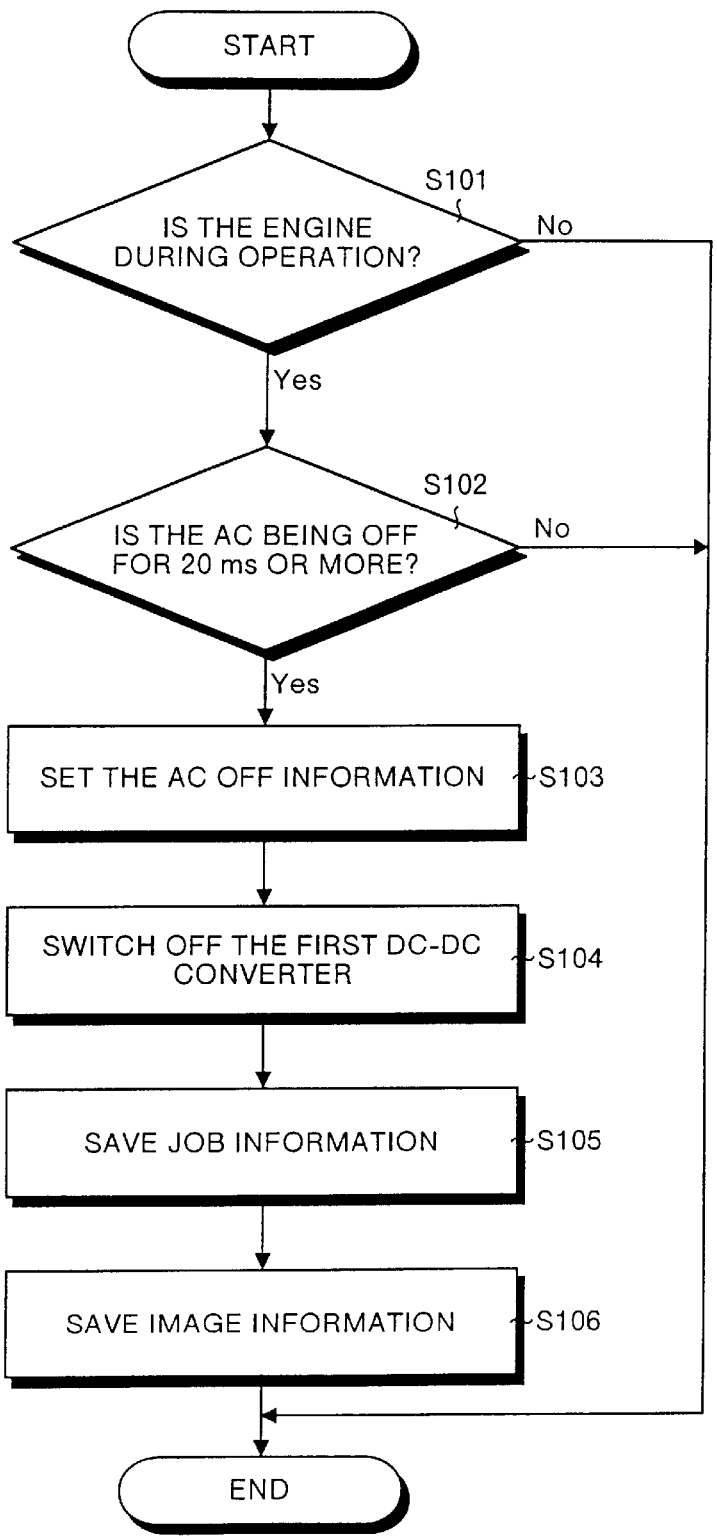
FIG. 11 is a flowchart for explaining processing of an engine control unit.
Figure 12A:
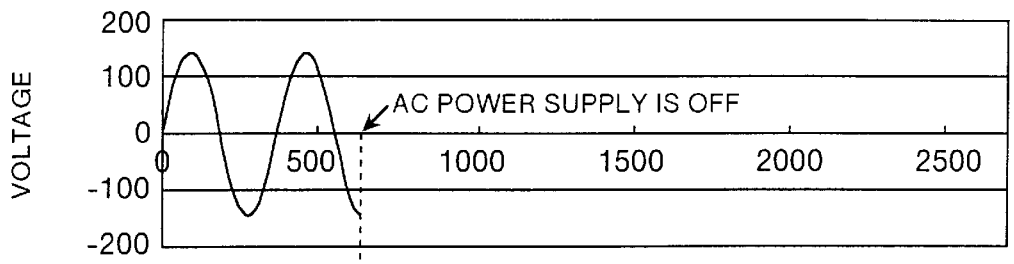
FIG. 12A is a waveform for detecting that the AC power supply is off.
Figure 12B:
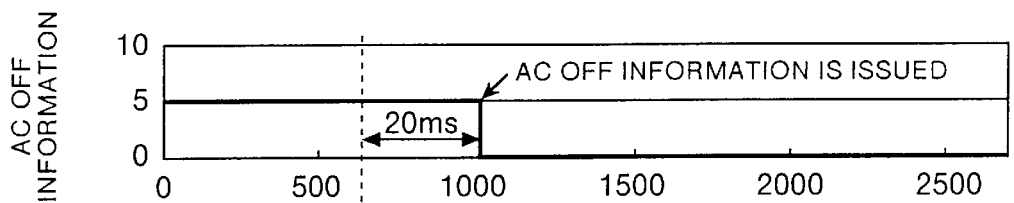
FIG. 12B is a diagram for explaining issuing of an AC OFF information.
Figure 12C:
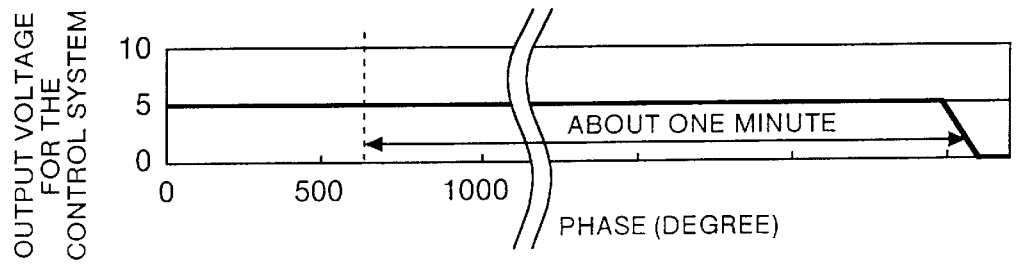
FIG. 12C is a diagram for explaining an output voltage of a second DC—DC converter (soft power supply system)

The processing of the engine control unit 18 will be explained below according to the flowchart of the FIG. 11 with reference to FIG. 12. FIG. 11 shows the flowchart for explaining the processing of the engine control unit 18. FIGS. 12A, 12B, and 12C show the waveform for explaining detection of the off state of the AC power and an output voltage of the second DC—DC converter (soft power supply system) 16. FIG. 12A shows a detected voltage of the AC power supply 11, FIG. 12B shows a timing of issuing AC power OFF information, and FIG. 12C shows an output voltage (output voltage for the control system) of the DC—DC converter (soft power supply system) 16.

As shown in FIG. 11, the engine control unit 18 determines whether the image forming engine 19 is during operation. If the image forming engine 19 is not during operation (NO at step S101), the engine control unit 18 ends the flow. On the other hand, if the image forming engine 19 is during operation (YES at step S101), the engine control unit 18 determines whether the AC power supply is being OFF for not less than 20 ms (step S102).

If it is determined that the AC power supply is not being OFF for not less than 20 ms (NO at step S102), the engine control unit 18 ends the flow. On the other hand, if it is determined that the AC power supply is being OFF for not less than 20 ms (YES at step S102), the engine control unit 18 stores the "AC OFF information" indicating that the AC power supply 11 is turned off, in the nonvolatile memory 104 at the timing shown in FIGS. 12A and 12B (step S103).

The time required for determining the AC power supply 11 as being OFF is set to 20 ms corresponding to one cycle in the frequency of 50 Hz of the AC power supply 11. It is known that instantaneous power failure of not more than a half cycle (10 ms) occurs in the commercial power supply generally used as the AC power supply. Therefore, the ordinary switching power supply is configured to enable continuous supply of power in order to cope with a case where the AC power supply is being OFF for at least 10 ms. In this embodiment, the active filter 14 and the DC—DC converter are provided so as to elongate the power supply time when the AC power supply is OFF. In order to further elongate the power supply time, the AC OFF information is set when the AC power supply is being OFF for not less than 20 ms corresponding to one cycle, which is determined as an excess of a time period of the ordinary instantaneous power failure.

The engine control unit 18 then transmits an AC power OFF signal that allows the power of the first DC—DC converter (power supply system) 15 to be turned off, to the power supply control unit 17 through a communication terminal (S1). The power supply control unit 17 stops the output of a PWM signal (PWM1) to the first DC—DC converter (power supply system) 15 in response to reception of the AC power OFF signal so that the first DC—DC converter (power supply system) 15 is switched off (step S104). This makes it possible to elongate the time since the AC power supply 11 is off until the output of the second (control system) DC—DC converter 16, that supplies a voltage to the engine control unit 18, is off.

More specifically, the output of the first DC—DC converter (power supply system) 15, which is used to drive the mechanical parts of the image forming engine 100, is switched off, and it is thereby possible to elongate a discharging time of charge in an output capacitor C1 by reducing a load current of the active filter 14. This makes it possible to elongate a time required when the charge in the output capacitor C1 is reduced to a lower limit for operation, and thereby the second DC—DC converter (soft power supply system) 16 is switched off after about one minute since the AC power supply 11 is off, as shown in FIG. 12C.

The engine control unit 18 then saves the job information such as a number of sheets to be printed or two-sided/single-sided printing in processing by the image forming engine 19, on the nonvolatile memory 104 (step S105). Further, the engine control unit 18 saves the image information in processing on the nonvolatile memory 104 (step S106).

When the AC power supply 11 is switched on again, the engine control unit 18 displays a message indicating that the AC power supply 11 has been OFF during the previous processing on a display section (not shown), and further displays the information saved on the nonvolatile memory 104 when recovery of the interrupted processing is instructed.

As explained above, according to the first embodiment, the active filter 14 converts the AC voltage supplied from the AC power supply to a DC voltage, and the first DC—DC converter 15 converts the DC voltage input from the active filter 14 to a voltage at a first level (24 volts) and supplies the converted voltage to the image forming engine 19. The second DC—DC converter 16 converts the DC voltage input from the active filter 14 to a voltage at a second level (5 volts) and supplies the converted voltage to the engine control unit 18. The engine control unit 18 controls the image forming engine 19, transmits the AC power OFF signal to the power supply control unit 17 when it is detected that AC power supply is disconnected, and saves the image information or the job information in processing on the nonvolatile memory 104. When receiving the AC power OFF signal, the power supply control unit 17 allows the first DC—DC converter 15 to be switched off in order to allow the second DC—DC converter 16 to continue the supply of the voltage to the engine control unit 18 for a predetermined time. Thus, it is possible to protect the image information and the job information in processing with a simple and low-cost configuration when the AC power supply is erroneously turned off or power failure occurs, which makes recovery processing easier.

Figure 13:
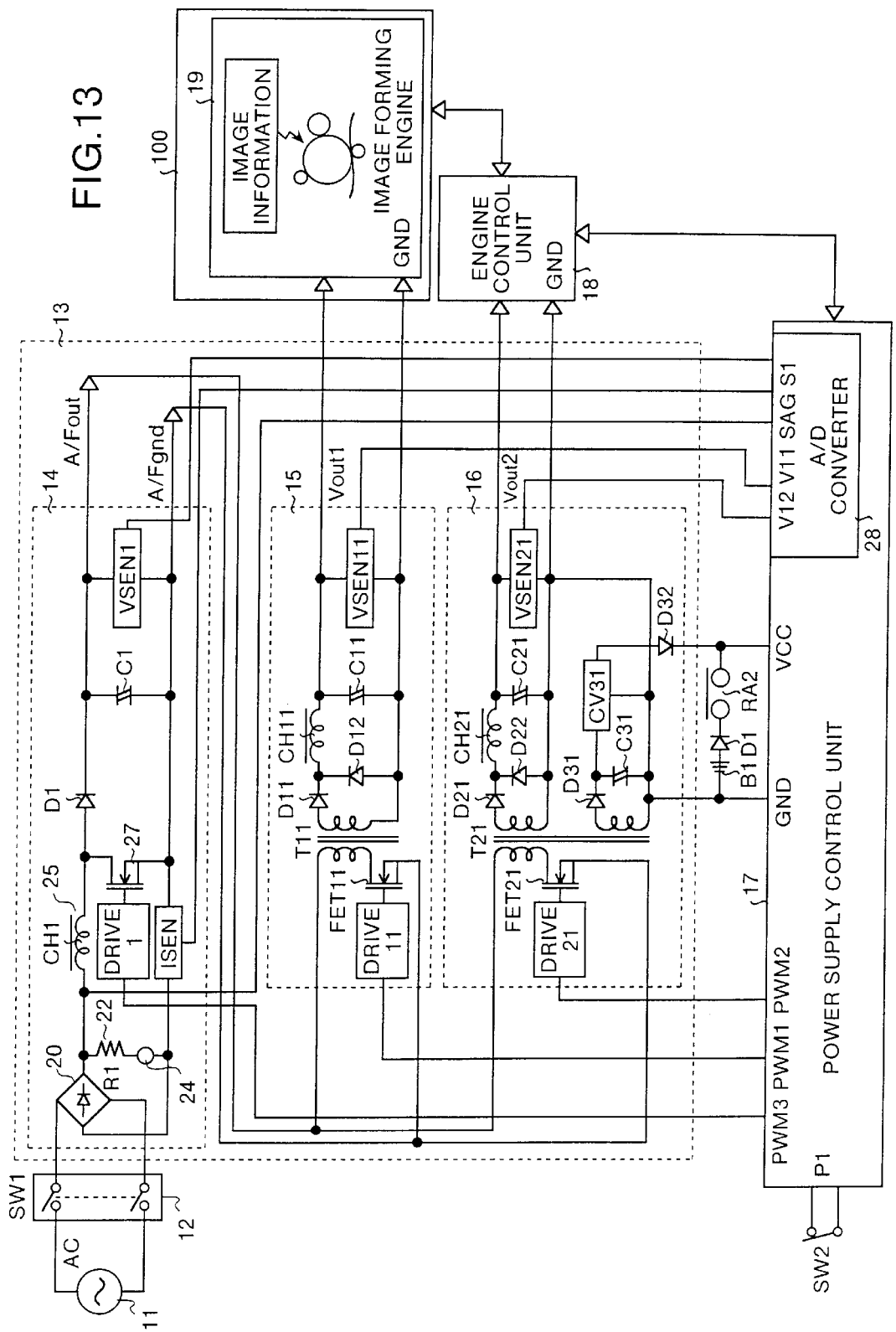
FIG. 13 is a diagram showing a configuration of a power supply control system in an image formation apparatus according to a second embodiment.

An image formation apparatus according to a second embodiment of this invention will be explained below with reference to FIG. 13 to FIG. 15. The external configuration of the image formation apparatus according to the second embodiment is the same as that of the first embodiment (FIG. 1), and therefore explanation of the external configuration is omitted. FIG. 13 is a diagram showing the configuration of the power supply control system in the image formation apparatus according to the second embodiment. In FIG. 13, the same legends are assigned to those corresponding to the sections having the equivalent functions in FIG. 3.

There is a different point in the configuration of FIG. 13 from that of FIG. 3 (first embodiment), that is, the function of the power supply control unit 17 is expanded. The power supply control unit 17 controls the active filter 14 and detects whether the AC power supply 11 is disconnected.

As shown in FIG. 13, the switching power supply 13 is composed of the active filter 14, and the first and second DC—DC converters 15 and 16. The switching power supply 13 is provided with the AC power from the AC power supply 11 through the main power switch 12. The output of the first DC—DC converter 15 is supplied to the image forming engine 19 as a load, and the output of the second DC—DC converter 16 is supplied to the engine control unit 18. The power supply control unit 17 controls the active filter 14 and the first and second DC—DC converters 15 and 16.

When the main power switch 12 is turned on, the AC power is supplied from the AC power supply 11 to the switching power supply 13. In the switching power supply 13, a voltage having a full-wave rectified waveform is output from the diode bridge 20 of the active filter 14. The voltage having the full-wave rectified waveform is input to the starting circuit composed of the diode 21, the resistor 22, the capacitor 23, and the coil of the relay 24 to turn on the contact of the relay 24. This makes it possible to supply the voltage from the buttery (B1) to the power supply terminal (VCC) of the power supply control unit 17 through the diode (D1) to activate the power supply control unit 17.

The power supply control unit 17, which has been activated, starts controlling so as to activate the second DC—DC converter 16. When the second DC—DC converter 16 is activated, DC power is supplied from the output terminal (Vout2) to the engine control unit 18 to activate the engine control unit 18.

The power supply control unit 17 activates the active filter 14 and the first DC—DC converter 15 that generates the DC power for the power system. The active filter 14 is controlled in the same manner as that of the first embodiment so that the input current has a sinusoidal wave similar to the waveform of the AC power. In the second embodiment, however, the power supply control unit 17 controls the active filter 14 through the processing using the software.

The control for the active filter 14 by the power supply control unit 17 will be explained with reference to FIG. 14. FIG. 14 is a flowchart for explaining the control (A/F control) for the active filter 14 in the power supply control unit 17.

Figure 14:
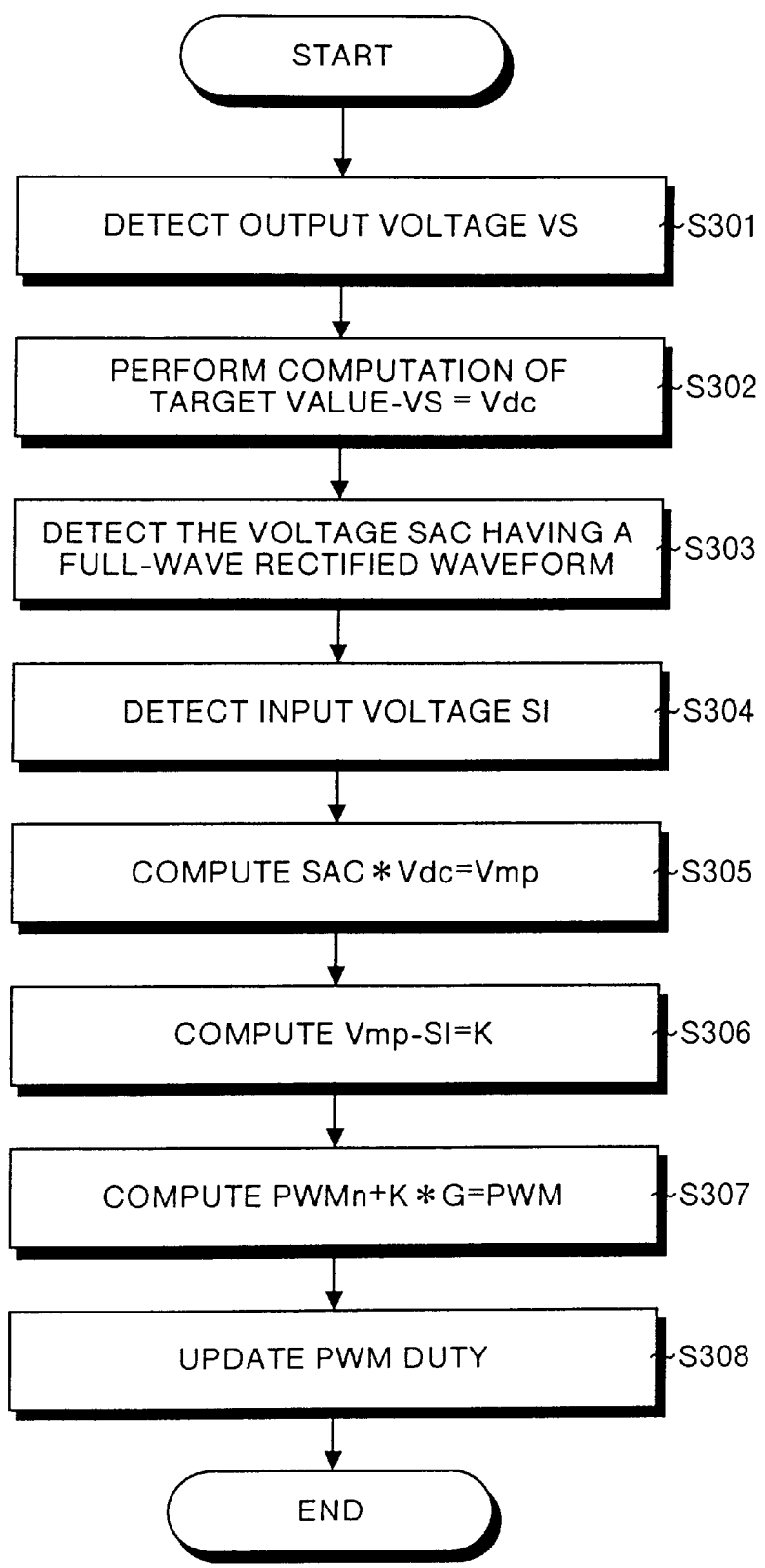
FIG. 14 is a flowchart for explaining control (A/F control) for the active filter in the power supply control unit.

As shown in FIG. 14, in the power supply control unit 17, an output voltage (VS) detected by the voltage detection unit (VSEN1) is taken in by the internally provided A-D converter 28, the output voltage is subjected to A-D conversion to detect the converted voltage as a digital value (detected value) (step S301). The power supply control unit 17 performs computation of a difference (target value−VS=Vdc) between a preset target value and the output voltage (VS) (step S302). In the power supply control unit 17, the internally provided A-D converter 28 detects an instantaneous voltage (SAC) having the full-wave rectified waveform of the AC power supply 11 as a digital value (step S303), and also detects an input current (SI) detected by the current detection unit (ISEN1) as a digital value (step S304).

The power supply control unit 17 performs multiplication (SAC*Vdc=Vmp) of the instantaneous voltage (SAC) having the full-wave rectified waveform by the difference Vdc (step S305). The power supply control unit 17 performs computation of a difference (Vmp−SI=K) between the multiplied result (Vmp) and the input current (SI) in order to form the input current (SI) to a waveform similar to the input voltage (voltage having the full-wave rectified waveform of the AC power supply 11) (step S306).

Further, the power supply control unit 17 performs computation (PWMn+K*G=PWMn) in which a value obtained by multiplying the difference K by a constant G is added to the pulse width PWMn of the current PWM signal. The power supply control unit 17 determines the result of computation as a new pulse width PWMn (step S307), and generates a PWM signal (PWM3) with the new pulse width PWMn to output a generated PWM signal to the drive circuit (DRIVE 1) of the active filter 14 (step S308). The drive circuit (DRIVE 1) switches the transistor 27 using the PWM signal (PWM3) input from the power supply control unit 17. The power supply control unit 17 controls so that the input current to the active filter 14 is formed to a waveform similar to a sinusoidal wave having the full-wave rectified waveform of the AC power supply 11 by repeating the series of processing (e.g., in a 100 microsecond cycle time).

The operation of the power supply control unit 17 that detects whether the AC power supply 11 is disconnected will be explained below with reference to the flowchart of FIG. 15. This flowchart is shown for explaining the operation of the power supply control unit 17 that detects whether the AC power supply 11 is disconnected.

Figure 15:
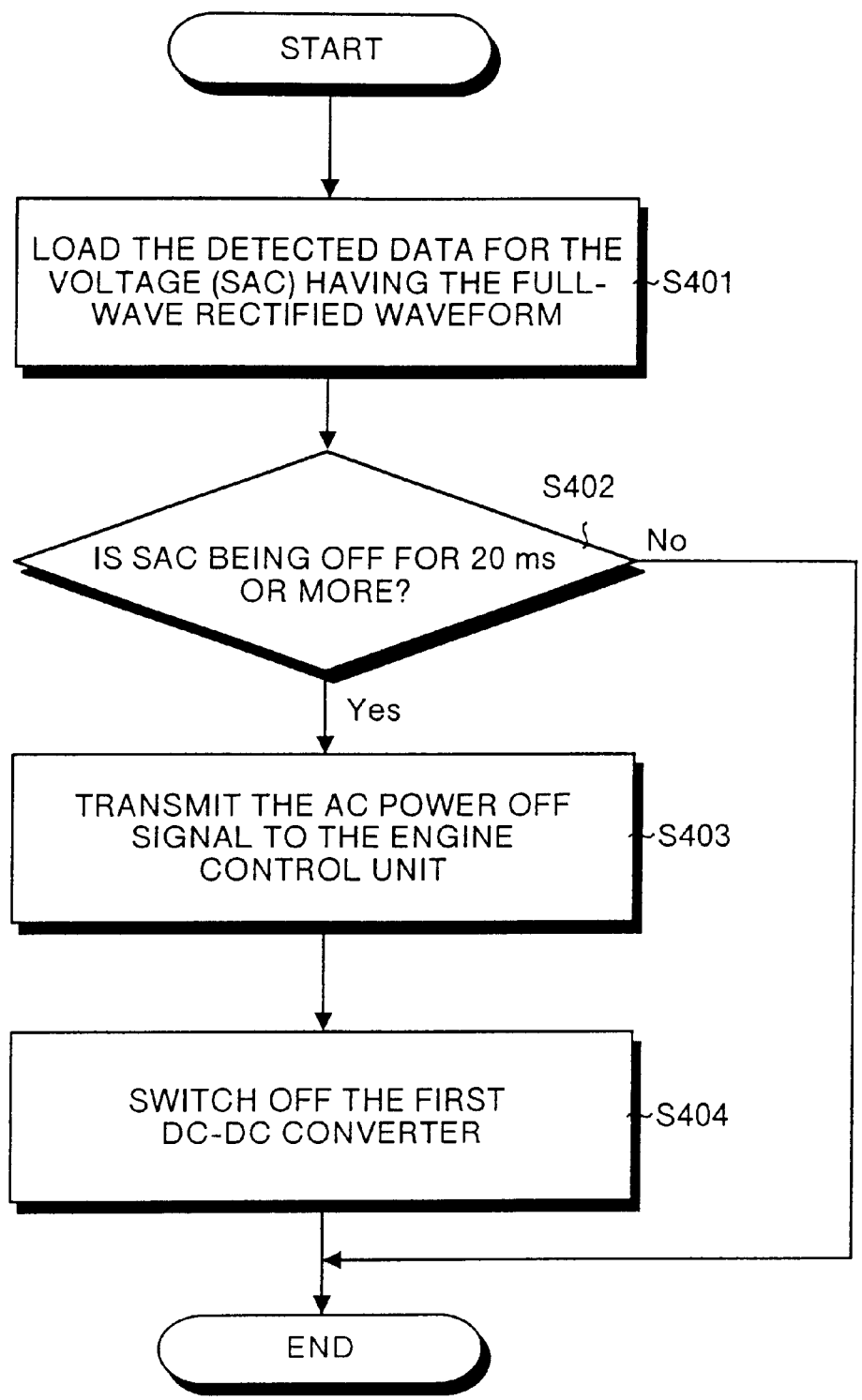
FIG. 15 is a flowchart for explaining operation of the power supply control unit that detects whether the AC power supply is disconnected.

As shown in FIG. 15, the power supply control unit 17 loads the data for the instantaneous voltage (SAC) having the full-wave rectified waveform detected under the control for the active filter 14 (step S401), and determines whether the AC power supply 11 is being OFF for not less than 20 ms, that is, whether the voltage is not high than a predetermined voltage (for example, whether the voltage is continued to be 10 volts or less) (step S402). If it is determined that the AC power supply 11 is not being OFF for not less than 20 ms (NO at step S402), the power supply control unit 17 ends the flow. On the other hand, if the AC power supply 11 is being OFF for not less than 20 ms (YES at step S402), the power supply control unit 17 transmits the AC power OFF signal to the engine control unit 18 through the communication terminal (S1) (step S403). The power supply control unit 17 stops the output of the PWM signal (PWM1) to the first DC—DC converter (power supply system) 15 so that the operation of the first DC—DC converter (power supply system) 15 is switched off (step S404).

On the other hand, when receiving the AC power OFF signal from the power supply control unit 17, the engine control unit 18 saves the job information and the image information in processing on the nonvolatile memory 104 in the same manner as that of the first embodiment.

As explained above, according to the second embodiment, the active filter 14 converts the AC voltage supplied from the AC power supply to a DC voltage, and the first DC—DC converter 15 converts the DC voltage input from the active filter 14 to a voltage at the first level (24 volts) and supplies the converted voltage to the image forming engine 19. The second DC—DC converter 16 converts the DC voltage input from the active filter 14 to a voltage at the second level (5 volts) and supplies the converted voltage to the engine control unit 18. When detecting disconnection of the AC power supply 11, the power supply control unit 17 transmits the AC power OFF signal to the engine control unit 18 so that the operation of the first DC—DC converter 15 is switched off, in order to allow the second DC—DC converter 16 to continue the supply of the voltage to the engine control unit 18 for the predetermined time. When receiving the AC power OFF signal, the engine control unit 18 saves the image information and the job information in processing on the nonvolatile memory 104. Thus, it is possible to protect the image information and the job information in processing with a simple and low-cost configuration when the AC power supply is erroneously turned off or power failure occurs, which makes recovery processing easier.

According to the power supply control apparatus as one aspect of this invention, the active filter converts an AC voltage supplied from the AC power supply to a DC voltage, the DC—DC converter converts the DC voltage converted by the active filter to voltages at predetermined levels, and respectively supplies the voltages to the load and the load control unit that controls the load, and the detection unit detects disconnection of the AC power supply. When the detection unit detects disconnection of the AC power supply, the power supply control unit controls the DC—DC converter in order to allow the DC—DC converter to continue the supply of the voltage to the load control unit for the predetermined time. Therefore, it is possible to protect information in processing by supplying the voltage to the load control unit that processes information for a predetermined time, even if the AC power supply is disconnected. Thus, an advantageous effect is obtained, that is, it is possible to provide the power supply control apparatus capable of protecting information in processing with a simple and low-cost configuration when the AC power supply is erroneously turned off or power failure occurs.

Moreover, the first DC—DC converter converts the DC voltage converted by the active filter to a voltage at the first level and supplies the voltage to the load, and the second DC—DC converter converts the DC voltage converted by the active filter to a voltage at the second level and supplies the voltage to the load control unit. When the detection unit detects disconnection of the AC power supply, the power supply control unit stops the operation of the first DC—DC converter in order to allow the second DC—DC converter to continue the supply of the voltage to the load control unit for the predetermined time. Therefore, it is possible to continue supply of the voltage to the load control unit for a predetermined time by consuming the charge in the capacitor of the active filter only in the second DC—DC converter. Thus, in addition to the above-mentioned advantageous effect, another advantageous effect is obtained, that is, it is possible to provide the power supply control apparatus capable of ensuring the operation of the load control unit for a predetermined time.

Furthermore, in the above-mentioned aspect, when the detection unit detects disconnection of the AC power supply, the load control unit saves the job information in processing on the nonvolatile memory. Thus, in addition to the above-mentioned advantageous effect, a further advantageous effect is obtained, that is, it is possible to provide the power supply control apparatus capable of protecting the job information in processing and easily returning to the operation in processing.

Moreover, in the above-mentioned aspect, the detection unit is a unit that detects disconnection of the AC power supply through detection of the full-wave rectified waveform of the AC power supply. Thus, in addition to the above-mentioned advantageous effect, a still further advantageous effect is obtained, that is, it is possible to provide the power supply control apparatus capable of easily and highly precisely detecting disconnection of the AC power supply.

Furthermore, in the above-mentioned aspect, the active filter control unit controls the active filter so that a waveform of an input current to the active filter is formed to a waveform similar to a waveform of an input voltage. Thus, in addition to the above-mentioned advantageous effect, a still further advantageous effect is obtained, that is, it is possible to provide the power supply control apparatus capable of stabilizing the input current.

According to the image formation apparatus as another aspect of this invention, the image forming engine emits laser beams corresponding to image information onto a photoreceptor to form an electrostatic latent image on the photoreceptor, forms a toner image on the electrostatic latent image, and transfers the formed toner image to a transfer sheet. The image forming engine control unit controls the image forming engine, the active filter converts an AC voltage supplied from the AC power supply to a DC voltage, the DC—DC converter converts the DC voltage converted by the active filter to voltages at predetermined levels and respectively supplies the voltages to the image forming engine and the image forming engine control unit, and the detection unit detects disconnection of the AC power supply. When the detection unit detects disconnection of the AC power supply, the power supply control unit controls the operation of the DC—DC converter in order to allow the DC—DC converter to continue the supply of the voltage to the image forming engine control unit for a predetermined time. Therefore, it is possible to protect the information in processing by supplying the voltage to the load control unit that processes the information for a predetermined time, even if the AC power supply is disconnected. Thus, an advantageous effect is obtained, that is, it is possible to provide the image formation apparatus capable of protecting the information in processing with a simple and low-cost configuration when the AC power supply is erroneously turned off or power failure occurs.

Moreover, in the above-mentioned aspect, the first DC—DC converter converts the DC voltage converted by the active filter to a voltage at the first level and supplies the voltage to the image forming engine, and the second DC—DC converter converts the DC voltage converted by the active filter to a voltage at the second level that is lower than the first level and supplies the voltage to the image forming engine control unit. When the detection unit detects disconnection of the AC power supply, the power supply control unit stops the operation of the first DC—DC converter in order to allow the second DC—DC converter to continue the supply of the voltage to the image forming engine control unit for a predetermined time. Therefore, it is possible to continue supply of the voltage to the load control unit for a predetermined time by consuming the charge in the capacitor of the active filter only in the second DC—DC converter. Thus, in addition to the above-mentioned advantageous effect, another advantageous effect is obtained, that is, it is possible to provide the image formation apparatus capable of ensuring the operation of the load control unit for a predetermined time.

Furthermore, in the above-mentioned aspect, the load control unit saves the image information and job information in processing on the nonvolatile memory when the detection unit detects disconnection of the AC power supply. Thus, in addition to the above-mentioned advantageous effect, a further advantageous effect is obtained, that is, it is possible to provide the image formation apparatus capable of protecting the image information and job information in processing and easily returning to the operation in processing.

Moreover, in the above-mentioned aspect, the detection unit is a unit that detects disconnection of the AC power supply through detection of the full-wave rectified waveform of the AC power supply. Thus, in addition to the above-mentioned advantageous effect, a still further advantageous effect is obtained, that is, it is possible to provide the image formation apparatus capable of easily and highly precisely detecting disconnection of the AC power supply.

Furthermore, in the above-mentioned aspect, the active filter is controlled so that a waveform of an input current to the active filter is formed to a waveform similar to a waveform of an input voltage. Thus, in addition to the above-mentioned advantageous effect, a still further advantageous effect is obtained, that is, it is possible to provide the image formation apparatus capable of stabilizing the input current.

The present document incorporates by reference the entire contents of Japanese priority document, 2001-071943 filed in Japan on Mar. 14, 2001 and 2002-055055 filed in Japan on Feb. 28, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply control apparatus comprising:

an active filter configured to convert an AC voltage supplied from an AC power supply to a DC voltage;

a DC—DC converter configured to convert the DC voltage converted by said active filter to voltages at predetermined levels, and to supply the voltages respectively to a load and a load control unit that controls said load;

a power supply control unit configured to control operation of said DC—DC converter; and a detection unit configured to detect disconnection of the AC power supply, wherein said power supply control unit is further configured to control said DC—DC converter in order to allow said DC—DC converter to continue supply of the voltage to said load control unit for a predetermined time when said detection unit detects disconnection of the AC power supply.

2. The power supply control apparatus according to claim 1, wherein said DC—DC converter includes:

a first DC—DC converter configured to convert the DC voltage converted by said active filter to a voltage at a first level and to supply the voltage to said load; and a second DC—DC converter which converts the DC voltage converted by said active filter to a voltage at a second level that is lower than the first level, and to supply the voltage to said load control unit, wherein said power supply control unit is further configured to stop operation of said first DC—DC converter in order to allow said second DC—DC converter to continue supply of the voltage to said load control unit for a predetermined time when said detection unit detects disconnection of the AC power supply.

3. The power supply control apparatus according to claim 1, wherein said load control unit is configured to save information of a job in process, on a nonvolatile memory when said detection unit detects disconnection of the AC power supply.

4. The power supply control apparatus according to claim 1, wherein said active filter is further configured to rectify the AC voltage supplied from the AC power supply to a full-wave rectified waveform and then to generate the DC voltage, and said detection unit is further configured to detect disconnection of the AC power supply through detection of the full-wave rectified waveform of the AC power supply.

5. The power supply control apparatus according to claim 1, further comprising an active filter control unit configured to control said active filter so that a waveform of an input current to said active filter is formed to a waveform similar to a waveform of an input voltage to said active filter.

6. An image formation apparatus comprising:

an image forming engine configured to emit laser beams corresponding to image information onto a photoreceptor to form an electrostatic latent image on the photoreceptor, to form a toner image on the electrostatic latent image, and to transfer a formed toner image to a transfer sheet;

an image forming engine control unit configured to control said image forming engine;

an active filter configured to convert an AC voltage supplied from an AC power supply to a DC voltage;

a DC—DC converter configured to convert the DC voltage converted by said active filter to voltages at predetermined levels, and to supply the voltages to said image forming engine and said image forming engine control unit;

a power supply control unit configured to control operation of said DC—DC converter; and a detection unit configured to detect disconnection of the AC power supply, wherein said power supply control unit is further configured to control said DC—DC converter in order to allow said DC—DC converter to continue the supply of the voltage to said image forming engine control unit for a predetermined time when said detection unit detects disconnection of the AC power supply.

7. The image formation apparatus according to claim 6, wherein said DC—DC converter includes:

a first DC—DC converter configured to convert the DC voltage converted by said active filter to a voltage at a first level and to supply the voltage to said image forming engine; and a second DC—DC converter configured to convert the DC voltage converted by said active filter to a voltage at a second level that is lower than the first level, and to supply the voltage to said image forming engine control unit, wherein said power supply control unit is further configured to stop operation of said first DC—DC converter in order to allow said second DC—DC converter to continue supply of the voltage to said image forming engine control unit for a predetermined time when said detection unit detects disconnection of the AC power supply.

8. The image formation apparatus according to claim 6, wherein said image forming engine control unit is configured to save image information and information of a job in process, on a nonvolatile memory when said detection unit detects disconnection of the AC power supply.

9. The image formation apparatus according to claim 6, wherein said active filter is further configured to rectify the AC voltage supplied from the AC power supply to a full-wave rectified waveform and then to generate the DC voltage, and said detection unit is further configured to detect disconnection of the AC power supply through detection of the full-wave rectified waveform of the AC power supply.

10. The image formation apparatus according to claim 6, further comprising an active filter control unit configured to control said active filter so that a waveform of an input current to said active filter is formed to a waveform similar to a waveform of an input voltage to said active filter.

11. A method of controlling a power supply, comprising:

converting, with an active filter, an AC voltage supplied from an AC power supply to a DC voltage;

converting, with a DC—DC converter, the DC voltage converted by said active filter to voltages at predetermined levels;

supplying the voltages respectively to a load and a load control unit that controls said load;

detecting, with a detection unit, disconnection of the AC power supply; and controlling, with a power supply control unit, operation of said DC—DC converter to allow said DC—DC converter to continue supply of the voltage to said load control unit for a predetermined time when said detection unit detects disconnection of the AC power supply.

12. The method according to claim 11, wherein the step of converting the DC—DC voltage comprises:

converting, with a first DC—DC converter, the DC voltage converted by said active filter to a voltage at a first level; and converting, with a second DC—DC converter, the DC voltage converted by said active filter to a voltage at a second level that is lower than the first level;

wherein the step of supplying the voltages comprises the steps of:

supplying the voltage at the first level to the load; and supplying the voltage at the second level to the load control unit;

and wherein the method further comprises:

stopping operation of said first DC—DC converter in order to allow said second DC—DC converter to continue supply of the voltage to said load control unit for a predetermined time when said detection unit detects disconnection of the AC power supply.

13. The method according to claim 11, further comprising saving information of a job in process on a nonvolatile memory when said detection unit detects disconnection of the AC power supply.

14. The method according to claim 11, further comprising:

rectifying, with the active filter, the AC voltage supplied from the AC power supply to a full-wave rectified waveform to generate the DC voltage, and detecting, with the detection unit, disconnection of the AC power supply through detection of the full-wave rectified waveform of the AC power supply.

15. The method according to claim 11, further comprising:

controlling, with an active filter control unit, the active filter so that a waveform of an input current to said active filter is formed to a waveform similar to a waveform of an input voltage to said active filter.

16. A method for controlling a power supply of an image forming apparatus having an image forming engine configured to emit laser beams corresponding to image information onto a photoreceptor to form an electrostatic latent image on the photoreceptor, to form a toner image on the electrostatic latent image, and to transfer a formed toner image to a transfer sheet, and an image forming engine control unit configured to control said image forming engine, said method comprising:

converting, with an active filter, an AC voltage supplied from an AC power supply to a DC voltage;

converting, with a DC—DC converter, the DC voltage converted by said active filter to voltages at predetermined levels;

supplying the voltages respectively to the image forming engine and the image forming engine control unit;

detecting, with a detection unit, disconnection of the AC power supply; and controlling, with a power supply control unit, operation of said DC—DC converter to allow said DC—DC converter to continue supply of the voltage to said image forming engine control unit for a predetermined time when said detection unit detects disconnection of the AC power supply.

17. The method according to claim 16, wherein the step of converting the DC—DC voltage comprises:

converting, with a first DC—DC converter, the DC voltage converted by said active filter to a voltage at a first level; and converting, with a second DC—DC converter, the DC voltage converted by said active filter to a voltage at a second level that is lower than the first level;

wherein the step of supplying the voltages comprises the steps of:

supplying the voltage at the first level to the image forming engine; and supplying the voltage at the second level to the image forming engine control unit;

and wherein the method further comprises:

stopping operation of said first DC—DC converter in order to allow said second DC—DC converter to continue supply of the voltage to said image forming engine control unit for a predetermined time when said detection unit detects disconnection of the AC power supply.

18. The method according to claim 16, further comprising saving information of a job in process on a nonvolatile memory when said detection unit detects disconnection of the AC power supply.

19. The method according to claim 16, further comprising:

rectifying, with the active filter, the AC voltage supplied from the AC power supply to a full-wave rectified waveform to generate the DC voltage, and detecting, with the detection unit, disconnection of the AC power supply through detection of the full-wave rectified waveform of the AC power supply.

20. The method according to claim 16, further comprising:

controlling, with an active filter control unit, the active filter so that a waveform of an input current to said active filter is formed to a waveform similar to a waveform of an input voltage to said active filter.

* * * * *